United States Patent
Tsai et al.

(10) Patent No.: US 11,480,190 B2
(45) Date of Patent: Oct. 25, 2022

(54) FAN HAVING FIRST BODY AND SECOND BODY SLIDABLE RELATIVE TO EACH OTHER

(71) Applicants: Han-Hsuan Tsai, Taipei (TW); Jui-Min Huang, Taipei (TW); Wei-Hao Lan, Taipei (TW); Chien-Chu Chen, Taipei (TW); Ching-Ya Tu, Taipei (TW); Chih-Wen Chiang, Taipei (TW); Ching-Tai Chang, Taipei (TW); Ken-Ping Lin, Taipei (TW); Yao-Lin Chang, Taipei (TW); Cheng-Ya Chi, Taipei (TW)

(72) Inventors: Han-Hsuan Tsai, Taipei (TW); Jui-Min Huang, Taipei (TW); Wei-Hao Lan, Taipei (TW); Chien-Chu Chen, Taipei (TW); Ching-Ya Tu, Taipei (TW); Chih-Wen Chiang, Taipei (TW); Ching-Tai Chang, Taipei (TW); Ken-Ping Lin, Taipei (TW); Yao-Lin Chang, Taipei (TW); Cheng-Ya Chi, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 250 days.

(21) Appl. No.: 16/831,833

(22) Filed: Mar. 27, 2020

(65) Prior Publication Data

US 2020/0309138 A1    Oct. 1, 2020

Related U.S. Application Data

(60) Provisional application No. 62/825,003, filed on Mar. 27, 2019.

(51) Int. Cl.
*F04D 29/28* (2006.01)
*F04D 25/06* (2006.01)
(Continued)

(52) U.S. Cl.
CPC .......... *F04D 29/287* (2013.01); *F04D 17/10* (2013.01); *F04D 25/06* (2013.01); *F04D 29/054* (2013.01);
(Continued)

(58) Field of Classification Search
CPC ... F04D 29/287; F04D 25/163; F05B 2260/60
See application file for complete search history.

(56) References Cited

U.S. PATENT DOCUMENTS 3,773,106 A * 11/1973 Levy ..................... F04D 29/287
165/299
4,929,150 A * 5/1990 Daw ..................... F04D 29/464
415/157
(Continued)

FOREIGN PATENT DOCUMENTS

CN      103967836       8/2014
CN      109002131       12/2018
(Continued)

OTHER PUBLICATIONS

"Office Action of Taiwan Counterpart Application", dated Jan. 5, 2021, p. 1-p. 6.
"Office Action of China Counterpart Application", dated Mar. 24, 2021, p. 1-p. 8.

*Primary Examiner* — Nathan C Zollinger
*Assistant Examiner* — Timothy P Solak
(74) *Attorney, Agent, or Firm* — JCIPRNET

(57) ABSTRACT

A fan module including a first body, a second body, a first fan assembly, a power module, and a second fan assembly is provided. The second body is slidably disposed at the first body to form a circulation space together. The first fan assembly is rotatably disposed at the first body and has sliding grooves. The power module is disposed in the first body and connected to the first fan assembly. The second fan assembly is rotatably disposed at the second body and has (Continued)

sliding portions, respectively and slidably disposed in corresponding sliding grooves. The power module is adapted to drive the first and second fan assemblies to rotate relative to the first body. A link module is adapted to drive the first and second bodies to relatively slide along an axial direction, so that the first and second fan assemblies are relatively separated or overlapped along the axial direction.

14 Claims, 6 Drawing Sheets

(51) Int. Cl.
| | | |
|---|---|---|
| *F04D 17/10* | (2006.01) | |
| *F04D 29/054* | (2006.01) | |
| *F04D 29/42* | (2006.01) | |
| *G06F 1/20* | (2006.01) | |
| *F04D 25/08* | (2006.01) | |
| *F04D 25/02* | (2006.01) | |

(52) U.S. Cl.
CPC .......... *F04D 29/4226* (2013.01); *F04D 25/02* (2013.01); *F04D 25/08* (2013.01); *F04D 29/281* (2013.01); *G06F 1/20* (2013.01)

(56) References Cited

U.S. PATENT DOCUMENTS

| | | | | |
|---|---|---|---|---|
| 6,318,964 | B1* | 11/2001 | Yang | ............ B29C 45/006 |
| | | | | 415/198.1 |
| 6,572,336 | B2* | 6/2003 | Horng | ............ F04D 29/023 |
| | | | | 416/183 |
| 2005/0232765 | A1 | 10/2005 | Watanabe et al. | |
| 2007/0286717 | A1* | 12/2007 | Tseng | ............ F04D 25/0606 |
| | | | | 415/183 |
| 2009/0097978 | A1* | 4/2009 | Kao | ............ F04D 25/062 |
| | | | | 416/174 |
| 2011/0181140 | A1* | 7/2011 | Scherrer | ............ F04D 29/056 |
| | | | | 310/90.5 |
| 2017/0002833 | A1* | 1/2017 | Lin | ............ F04D 29/281 |
| 2017/0363097 | A1* | 12/2017 | Lin | ............ F04D 19/007 |

FOREIGN PATENT DOCUMENTS

| | | |
|---|---|---|
| TW | 201429376 | 7/2014 |
| TW | I482582 | 4/2015 |
| TW | M529761 | 10/2016 |
| TW | I672989 | 9/2019 |

\* cited by examiner

US 11,480,190 B2

FAN HAVING FIRST BODY AND SECOND BODY SLIDABLE RELATIVE TO EACH OTHER

CROSS-REFERENCE TO RELATED APPLICATION

This application claims the priority benefit of U.S. provisional application Ser. No. 62/825,003, filed on Mar. 27, 2019. The entirety of the above-mentioned patent application is hereby incorporated by reference herein and made a part of this specification.

BACKGROUND

Technical Field

The disclosure relates to a fan module, and in particular to a fan module with adjustable volume and heat dissipation efficiency.

Description of Related Art

All conventional fan modules installed in electronic devices or machines for heat dissipation adopt fixed and constant size specifications. The function of the fan module is to discharge hot air from inside the electronic device or the machine and draw in cold air from the outside. By convection of air, heat from the heat source of the electronic device or the machine is dissipated to maintain a stable operating temperature.

The conventional fan modules can only rely on the increase and decrease of the fan blade speed to adjust the heat dissipation efficiency thereof. Moreover, the conventional fan modules with fixed specifications can only be installed in electronic devices or machines of the corresponding specifications, thereby limiting the use of the conventional fan modules. As such, the development of a fan module that can be adjusted in size specifications to expand the usage range thereof is an important goal currently.

SUMMARY

The disclosure provides a fan module, which can adjust the volume and heat dissipation efficiency of the fan module according to requirements, so that the fan module has the characteristics of being light and thin, and having high heat dissipation efficiency.

A fan module of the disclosure includes a first body, a second body, a first fan assembly, a power module, and a second fan assembly. The second body is slidably disposed at the first body to form a circulation space together. The first fan assembly is rotatably disposed in the first body and is located in the circulation space. The first fan assembly has a plurality of sliding grooves. The power module is configured in the first body and is connected to the first fan assembly. The second fan assembly is rotatably disposed at the second body and is located in the circulation space. The second fan assembly has a plurality of sliding portions, respectively and slidably disposed in the plurality of corresponding sliding grooves. The power module is adapted to drive the first fan assembly and the second fan assembly to rotate relative to the first body. A link module is adapted to drive the first body and the second body to slide relative to each other along an axial direction, so that the first fan assembly and the second fan assembly are separated from each other or overlapped with each other along the axial direction.

In an embodiment of the disclosure, the first fan assembly has a first fan wheel and a plurality of first fan blades. The plurality of sliding grooves is formed on an outer ring surface of the first fan wheel and is spaced apart from each other. The plurality of first fan blades is disposed on the outer ring surface and each first fan blade is adjacent to each sliding groove.

In an embodiment of the disclosure, the second fan assembly has a second fan wheel and a plurality of second fan blades. The plurality of sliding portions is vertically formed on a bottom surface of the second fan wheel and is spaced apart from each other. Each second fan blade is disposed on each sliding portion. The second fan wheel covers the first fan wheel. The plurality of first fan blades and the plurality of second fan blades are staggered.

In an embodiment of the disclosure, the first body has a hollow cylinder, extending toward the second body along the axial direction. The first fan wheel is rotatably sleeved onto the hollow cylinder. The power module is disposed in the hollow cylinder and has a driving shaft, penetrating the hollow cylinder to connect the first fan wheel.

In an embodiment of the disclosure, each sliding portion has two sliding surfaces, each sliding groove has two blocking surfaces, and each blocking surface is in contact with each sliding surface, so that each sliding portion slides in each sliding groove along the axial direction.

In an embodiment of the disclosure, the fan module further includes a hinge assembly, connected to the second body and the second fan assembly. The second fan assembly rotates relative to the second body with the hinge assembly as a center of rotation.

In an embodiment of the disclosure, the hinge assembly has a first magnet shaft and a second magnet shaft. The first magnet shaft is disposed in the second body. The second magnet shaft is disposed in the second fan assembly and is magnetically in contact with the first magnet shaft.

In an embodiment of the disclosure, the first magnet shaft and the second magnet shaft respectively have a first arc surface and a second arc surface in contact with each other.

In an embodiment of the disclosure, the hinge assembly has a spindle, an inner ring, an outer ring, and a plurality of rollers. A first end of the spindle is connected to the second fan assembly and a second end penetrates the second body. The inner ring is fixedly sleeved onto the second end of the spindle. The outer ring is sleeved outside the inner ring and is fixed to the second body. The plurality of rollers is disposed between the inner ring and the outer ring.

In an embodiment of the disclosure, the second body has a plurality of intake holes, connected to the circulation space. The plurality of intake holes is formed around the axial direction and is located corresponding to the first fan assembly and the second fan assembly.

In an embodiment of the disclosure, the fan module further includes an air outlet, formed on one side of the first body and the second body and communicated with the circulation space. The first body and the second body are adapted to slide relative to each other to adjust an area of the air outlet.

In an embodiment of the disclosure, the link module is connected to the second body to drive the second body to move up and down relative to the first body along the axial direction.

In an embodiment of the disclosure, the link module has a rack and a motor. The rack is fixed to the second body. A gear of the motor is meshed with the rack. The gear is adapted to pivotally rotate toward a first rotational direction or a second rotational direction opposite to the first rotational direction, so as to lift up or lower down the rack.

In an embodiment of the disclosure, an inner diameter of the second body is greater than an outer diameter of the first body, so that the second body is wrapped around the first body.

Based on the above, the fan module of the disclosure has the first body and the second body that may slide relative to each other, thereby respectively driving the first fan assembly and the second fan assembly to separate from each other or overlap with each other along the axial direction. When the first body and the second body are away from each other, the cross-sectional area of the circulation space is increased and the first fan assembly and the second fan assembly are separated from each other, which is configured to increase the amount of air drawn and discharged, so as to have the characteristic of high heat dissipation efficiency. When the first body and the second body are near to each other, the cross-sectional area of the circulation space is reduced and the first fan assembly and the second fan assembly are overlapped with each other, which is configured to reduce the volume, so as to have the characteristic of thinning.

To make the aforementioned and other features of the disclosure more comprehensible, several embodiments accompanied with drawings are described in detail as follows.

DETAILED DESCRIPTION OF DISCLOSED EMBODIMENTS

Figure 1A:
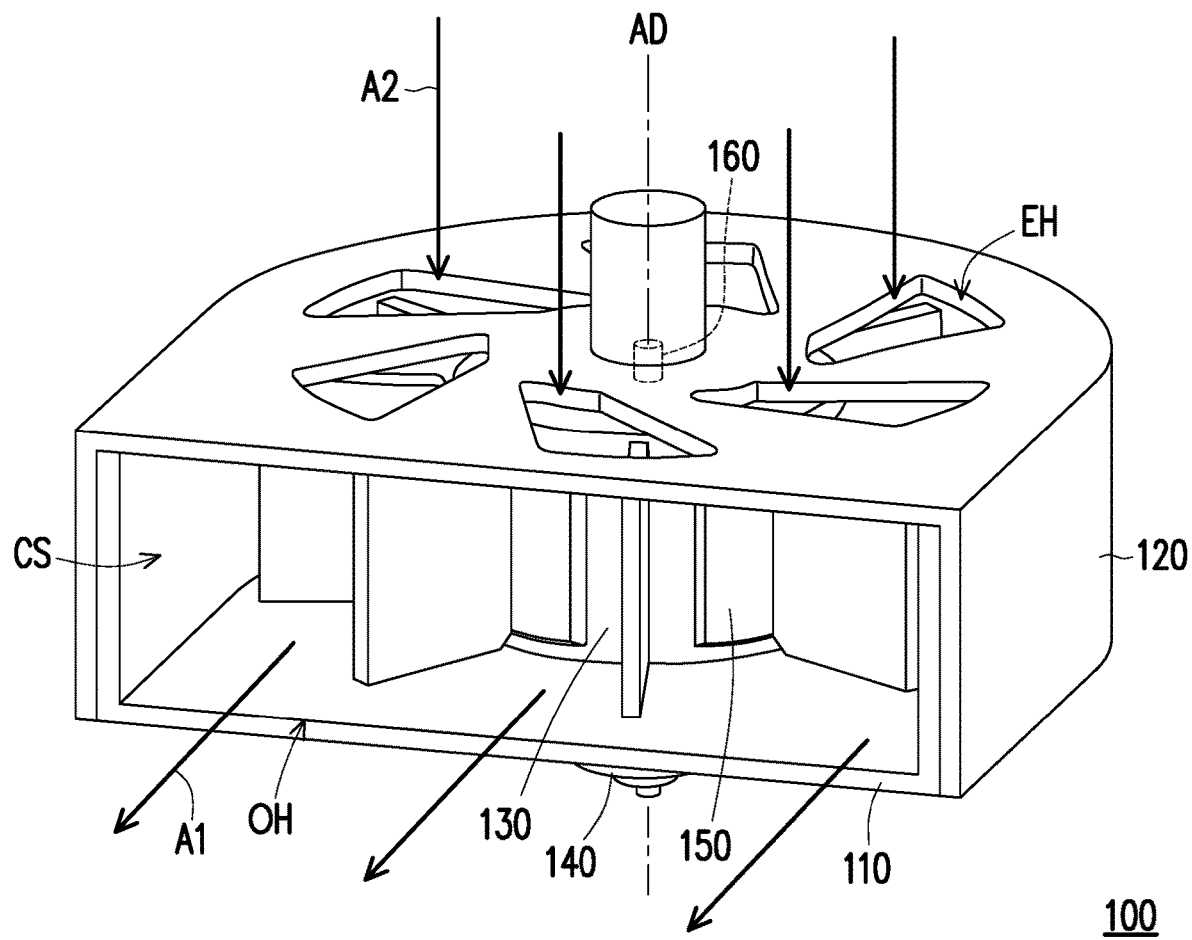
FIG. 1A is a perspective view of a fan module according to an embodiment of the disclosure.
Figure 1B:
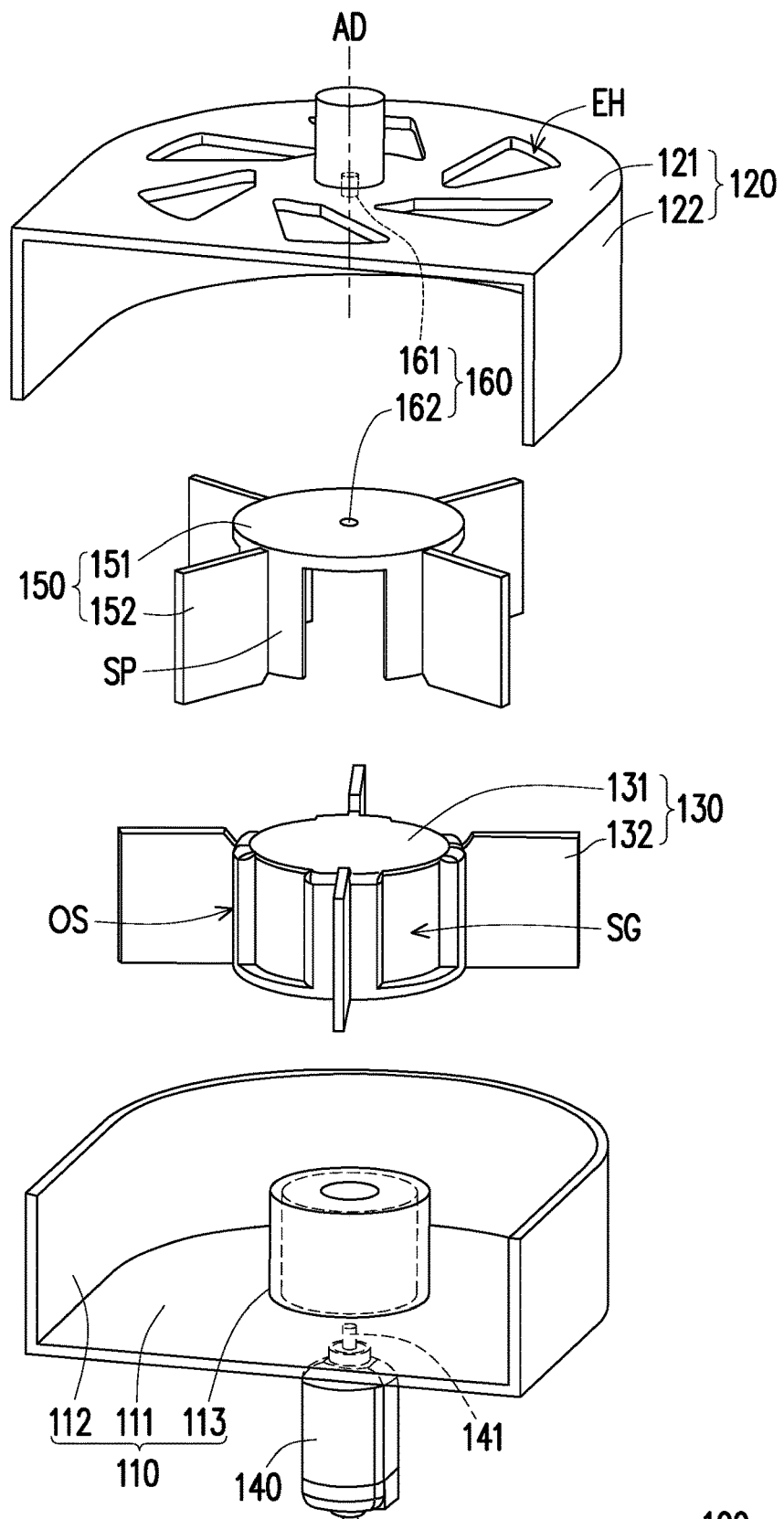
FIG. 1B is an exploded view of elements of the fan module of FIG. 1A.
Figure 1C:
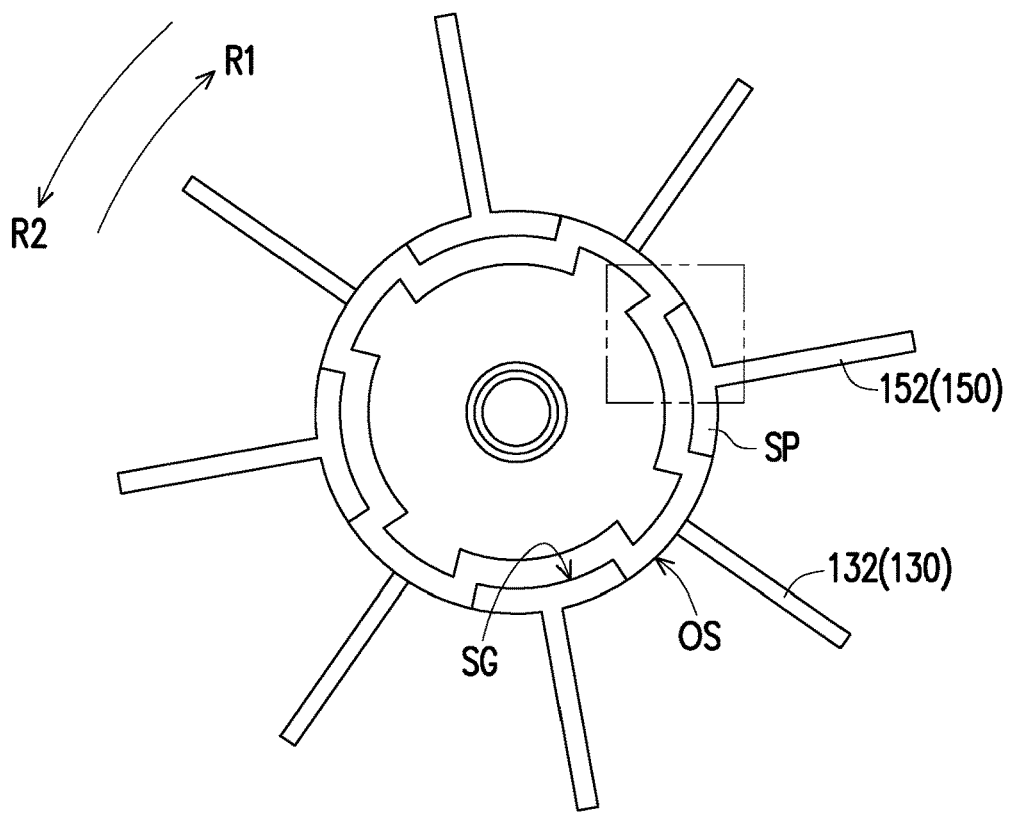
FIG. 1C is a top view of a portion of the elements of the fan module of FIG. 1A.
Figure 1D:
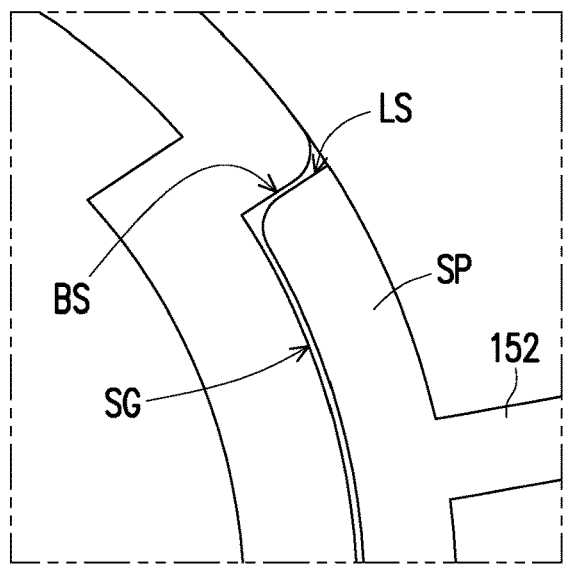
FIG. 1D is an enlarged view of a portion of the fan module of FIG. 1C.

FIG. 1A is a perspective view of a fan module according to an embodiment of the disclosure. FIG. 1B is an exploded view of elements of the fan module of FIG. 1A. FIG. 1C is a top view of a portion of the elements of the fan module of FIG. 1A. FIG. 1D is an enlarged view of a portion of the fan module of FIG. 1C.

Please refer to FIG. 1A and FIG. 1B. A fan module 100 of the disclosure is adapted to be disposed in an electronic device or a machine (such as a notebook computer or other similar devices) that generates waste heat and is configured to discharge the waste heat generated during operation of the electronic device or the machine. In short, the fan module 100 can discharge hot air in the electronic device or the machine and draw in cold air to achieve the objective of heat dissipation through convection of air.

The fan module 100 of the disclosure includes a first body 110, a second body 120, a first fan assembly 130, a power module 140, a second fan assembly 150, and a hinge assembly 160. The first body 110 has a U-shaped appearance and has a first base plate 111 and a first side plate 112. The first side plate 112 extends vertically from the outer edge of the first base plate 111. The second body 120 has a U-shaped appearance and has a second base plate 121 and a second side plate 122. The second side plate 122 extends vertically from the outer edge of the second base plate 121. The second body 120 is slidably disposed at the first body 110 to form a circulation space CS together.

In detail, the first base plate 111 and the second base plate 121 are parallel to each other, the first side plate 112 is located in the second side plate 122, and the first side plate 112 and the second side plate 122 are parallel to each other. An inner diameter ID of the second side plate 122 of the second body 120 is greater than an outer diameter OD of the first side plate 112 of the first body 110, so that the second body 120 is wrapped around the first body 110.

Please refer to FIG. 1A and FIG. 1B. The first fan assembly 130 is rotatably disposed at the first body 110 and is located in the circulation space CS. The first fan assembly 130 has a plurality of sliding grooves SG. The power module 140 is, for example, a motor, disposed in the first body 110, connected to the first fan assembly 130, and adapted to generate power to drive the first fan assembly 130 to rotate relative to the first body 110. The second fan assembly 150 is rotatably disposed at the second body 120 and is located in the circulation space CS. The second fan assembly 150 has a plurality of sliding portions SP, respectively and slidably disposed in the plurality of corresponding sliding grooves SG of the first fan assembly 130, that is, each sliding portion SP is adapted to slide along each sliding groove SG.

The hinge assembly 160 is connected to the second base plate 121 of the second body 120 and the second fan assembly 150. The second fan assembly 150 is rotated relative to the second body 120 with the hinge assembly 160 as a center of rotation.

Please refer to FIG. 1A and FIG. 1C. The power module 140 is adapted to drive the first fan assembly 130 and the second fan assembly 150 to rotate relative to the first body 110 and the second body 120, and the rotational direction thereof is, for example, a first rotational direction R1 or a second rotational direction R2 opposite to the first rotational direction R1.

Figure 2A:
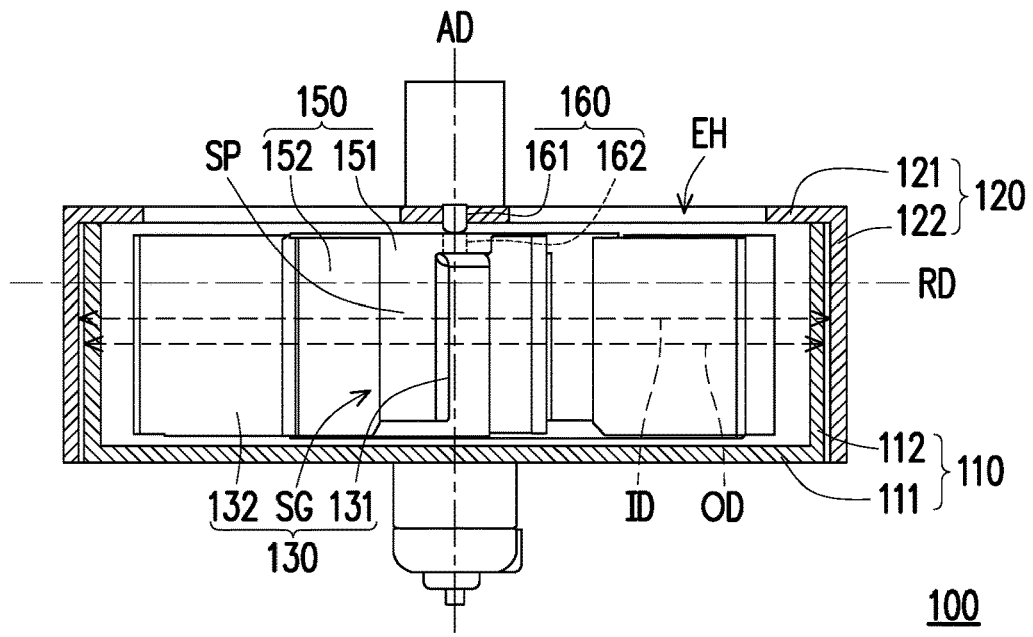
FIG. 2A is a side view of a thin mode of the fan module of FIG. 1A.
Figure 2B:
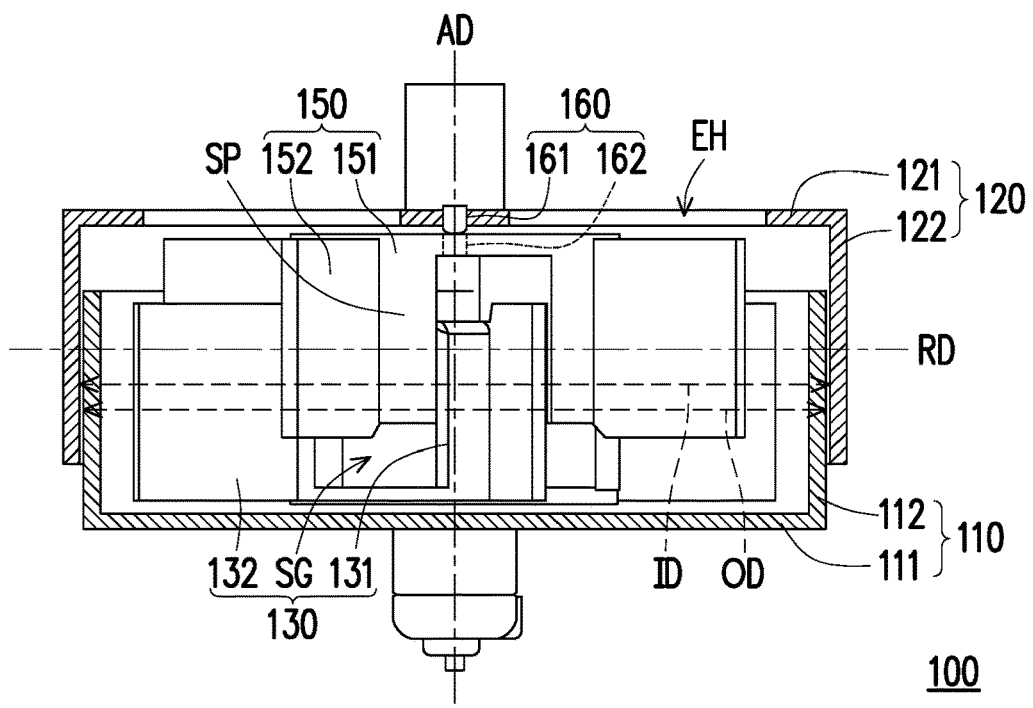
FIG. 2B is a side view of a high efficiency mode of the fan module of FIG. 1A.

FIG. 2A is a side view of a thin mode of the fan module of FIG. 1A. FIG. 2B is a side view of a high efficiency mode of the fan module of FIG. 1A.

Please refer to FIG. 2A and FIG. 2B. The first body 110 and the second body 120 are adapted to slide relative to each other along an axial direction AD to switch to a thin mode or a high efficiency mode. Under the thin mode, the first side plate 111 and the second side plate 121 are completely overlapped. Under the high efficiency mode, the first side plate 111 and the second side plate 121 are partially overlapped. In addition, the first body 110 and the second body 120 are adapted to respectively drive the first fan assembly 130 and the second fan assembly 150 to separate from each other (see FIG. 2B) or overlap with each other (see FIG. 2A) along the axial direction AD.

Further, the first fan assembly 130 has a first fan wheel 131 and a plurality of first fan blades 132. The plurality of sliding grooves SG is formed on an outer ring surface OS of the first fan wheel 131 and is spaced apart from each other.

The plurality of first fan blades 132 is disposed on the outer ring surface OS and each first fan blade 132 is adjacent to each sliding groove SG. The second fan assembly 150 has a second fan wheel 151 and a plurality of second fan blades 152. The plurality of sliding portions SP is vertically formed on the second fan wheel 151 and is spaced apart from each other, and each second fan blade 152 is disposed on each sliding portion SP. The second fan wheel 151 covers the first fan wheel 131. The plurality of first fan blades 132 and the plurality of second fan blades 152 are staggered.

Please refer to FIG. 1C and FIG. 1D. Each sliding portion SP has two sliding surfaces LS and each sliding groove SG has two blocking surfaces BS. Each blocking surface BS is in contact with each sliding surface LS. Each blocking surface BS and each sliding surface LS have an arc-shaped appearance to facilitate reduction of the contact area between each blocking surface BS and each sliding surface LS, thereby reducing friction. Further, the two blocking surfaces BS of the sliding groove SG are configured to limit the sliding portion SP, so that each sliding portion SP slides in each sliding groove SG along the axial direction AD.

Please refer to FIG. 1A and FIG. 1B. The first body 110 has a hollow cylinder 113, formed on the first base plate 111 and extending toward the second body 120 along the axial direction AD. The first fan wheel 131 is rotatably sleeved onto the hollow cylinder 113. The power module 140 is disposed in the hollow cylinder 113 and has a driving shaft 141. The driving shaft 141 penetrates the hollow cylinder 113 to connect the first fan wheel 131 of the first fan assembly 130. The power module 140 is adapted to drive the first fan wheel 131 and the second fan wheel 151 to rotate through the driving shaft 141.

Please refer to FIG. 1A and FIG. 1C. The second body 120 has a plurality of exhaust holes EH, penetrating the second base plate 121 and communicated with the circulation space CS. The plurality of intake holes EH is formed around the axial direction AD and is located corresponding to the plurality of first fan blades 132 of the first fan assembly 130 and the plurality of second fan blades 152 of the second fan assembly 150. An air outlet OH is formed on one side of the first body 110 and the second body 120 and is communicated with the circulation space CS. The first body 110 and the second body 120 are adapted to slide relative to each other, so as to adjust an area of the air outlet OH. The first base plate 111, the second base plate 121, the first side plate 112, and the second side plate 122 surround to form the air outlet OH. In short, when the power module 140 drives the first fan assembly 130 and the second fan assembly 150 to rotate, the plurality of first fan blades 132 and the plurality of second fan blades 152 discharge an air A1 in the circulation space CS from the air outlet OH while an air A2 from the outside enters the circulation space CS from the plurality of intake holes EH, so as to achieve circulation of heat dissipation. Therefore, the larger the area of the air outlet OH, the higher the heat dissipation efficiency of the fan module 100.

Please refer to FIG. 1A and FIG. 2A. When the fan module 100 is switched to the thin mode, the first side plate 112 of the first body 110 is abutted against the second base plate 121 of the second body 120 and is overlapped with the second side plate 122. Under the thin mode, the cross-sectional areas of the circulation space CS and the air outlet OH are the smallest, so as to achieve the objective of reducing volume. In addition, the first fan wheel 131 and the second fan wheel 151 are abutted against each other and the plurality of first fan blades 132 and the plurality of second fan blades 152 are overlapped with each other in a radial direction RD perpendicular to the axial direction AD. Please refer to FIG. 2B. When the fan module 100 is switched to the high efficiency mode, the first side plate 112 of the first body 110 is away from the second base plate 121 of the second body 120 and is partially overlapped with the second side plate 122. Under the high efficiency mode, the cross-sectional areas of the circulation space CS and the air outlet OH are the greatest, so as to achieve the objective of improving heat dissipation efficiency. In addition, the first fan wheel 131 and the second fan wheel 151 are separated from each other and the plurality of first fan blades 132 and the plurality of second fan blades 152 are partially overlapped in the radial direction RD perpendicular to the axial direction AD, thereby increasing the area of the fan in the radial direction RD.

Figure 3:
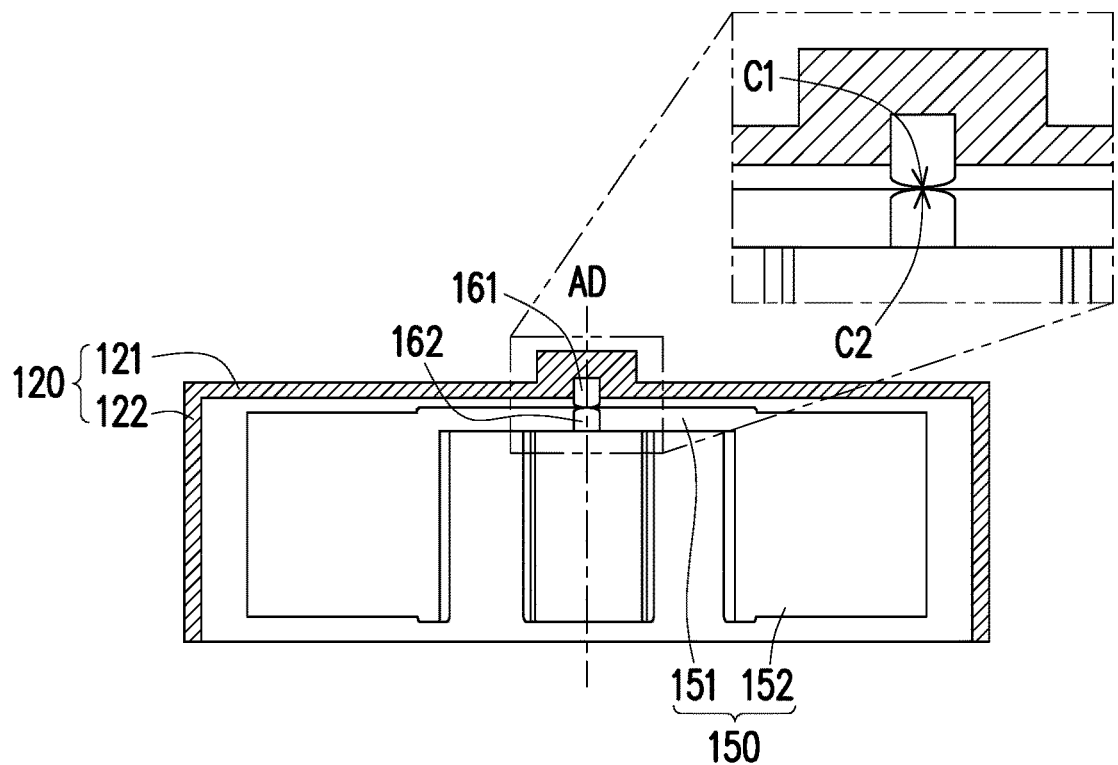
FIG. 3 is an enlarged view of a portion of a hinge assembly of the fan module of FIG. 2A.

FIG. 3 is an enlarged view of a portion of a hinge assembly of the fan module of FIG. 2A.

Please refer to FIG. 3. The hinge assembly 160 of the embodiment has a first magnet shaft 161 and a second magnet shaft 162. The first magnet shaft 161 is disposed in the second base plate 121 of the second body 120. The second magnet shaft 162 is disposed in the second fan wheel 151 of the second fan assembly 150 and is magnetically in contact with the first magnet shaft 161. The first magnet shaft 161 and the second magnet shaft 162 respectively have a first arc surface C1 and a second arc surface C2 in contact with each other. The first arc surface C1 and the second arc surface C2 have arc-shaped appearances, so that the contact area between the first magnet shaft 161 and the second magnet shaft 162 may be minimized to reduce friction.

In detail, the first magnet shaft 161 is fixed to the second base plate 121 and the first magnet shaft 161 is fixed to the second fan wheel 151, so that the second base plate 121 may drive the second fan wheel 151 to move along the axial direction AD through the magnetic attraction between the two. In addition, the second fan wheel 151 is rotated relative to the first magnet shaft 161 with the second magnet shaft 162 as the axis.

Figure 4:
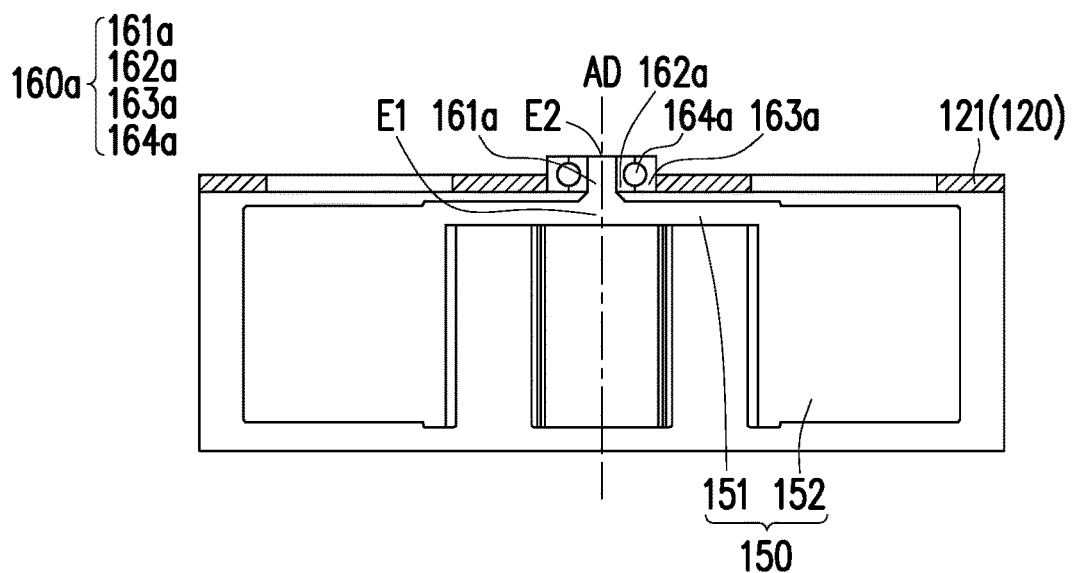
FIG. 4 is a plan view of a fan module according to another embodiment of the disclosure.

FIG. 4 is a plan view of a fan module according to another embodiment of the disclosure.

Please refer to FIG. 4. The fan module 100 adopts a hinge assembly 160a of another embodiment. The hinge assembly 160a has a spindle 161a, an inner ring 162a, an outer ring 163a, and a plurality of rollers 164a. A first end E1 of the spindle 161a is connected to the second fan wheel 151 of the second fan assembly 150 and a second end E2 penetrates the second base plate 121 of the second body 120, showing that the spindle 161a and the second fan wheel 151 are connected as one. The inner ring 162a is fixedly sleeved onto the second end E2 of the spindle 161a, that is, the inner ring 162a and the spindle 161a are adapted to synchronously rotate. The outer ring 163a is sleeved outside the inner ring 162a and is fixed to the second body 120. The plurality of rollers 164a is disposed between the inner ring 162a and the outer ring 163a.

In detail, the second base plate 121 drives the second fan wheel 151 to move along the axial direction AD through the outer ring 163a. In addition, the second fan wheel 151 drives the inner ring 162a to rotate relative to the outer ring 163a through the spindle 161a. The plurality of rollers 164a is configured to reduce the frictional force when the inner ring 162a and the outer ring 163a rotate relative to each other.

Figure 5:
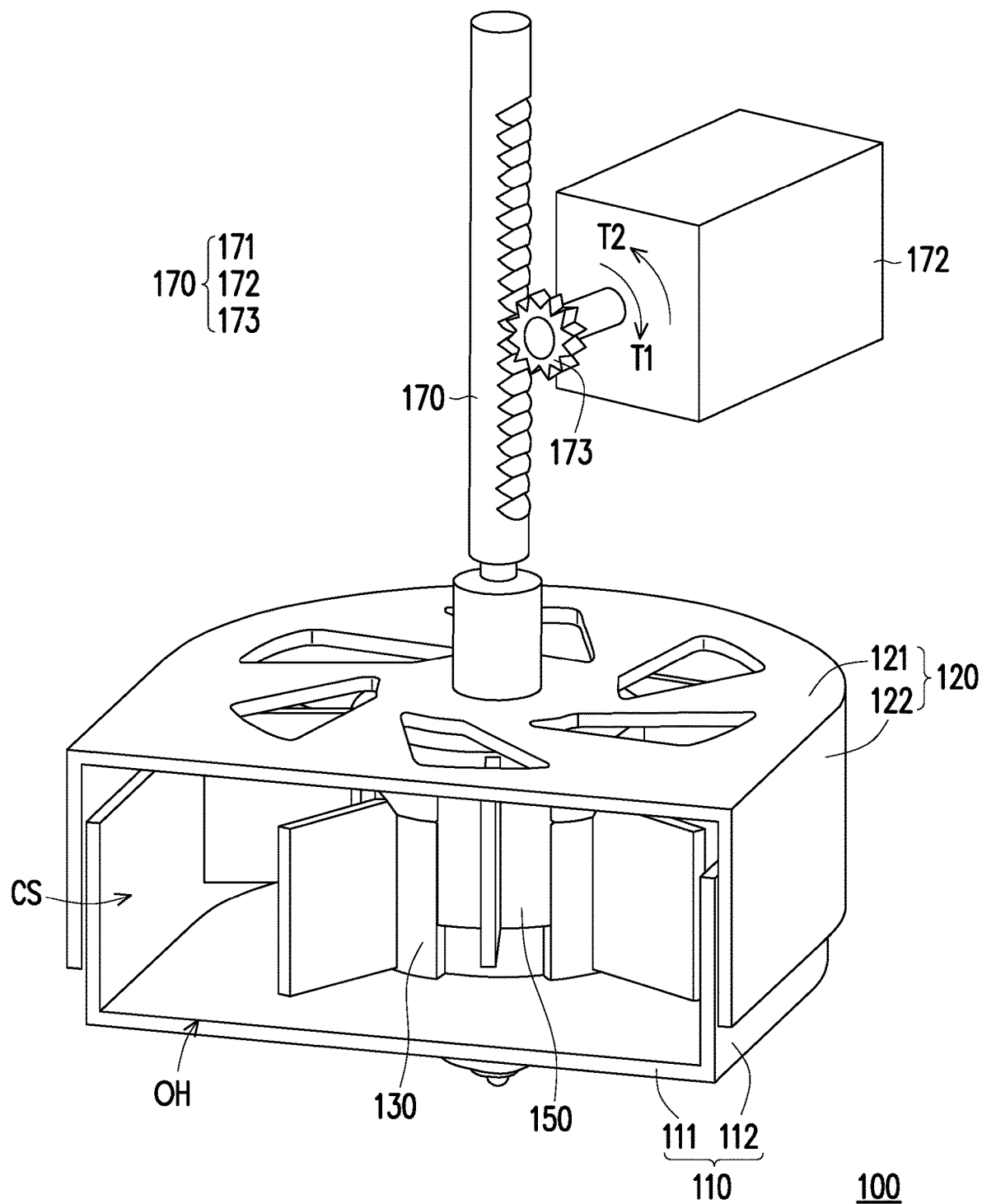
FIG. 5 is a perspective view of the fan module of FIG. 1A combined with a link module.

FIG. 5 is a perspective view of the fan module of FIG. 1A combined with a link module.

Please refer to FIG. 5. The fan module 100 of the embodiment includes a link module 170, connected to the second base plate 121 of the second body 120 and configured to drive the second body 120 to move up and down relative to the first body 110 along the axial direction AD.

The link module 170 has a rack 171 and a motor 172. The rack 171 is fixed to the second body 120 and is located at the center of the second base plate 121. A gear 173 of the motor 172 is meshed with the rack 171. The motor 172 is adapted to drive the gear 173 to pivotally rotate toward a first rotational direction T1 or a second rotational direction T2 opposite to the first rotational direction T1, so as to lift up or lower down the rack 171 and drive the second body 120 to move relative to the first body 110. In other embodiments, the link module is, for example, connected to the first body, so as to drive the first body to move relative to the second body, and the disclosure is not limited thereto.

In other embodiments, the link module is, for example, disposed on the first body or the second body. When the user applies an external force to the link module, the link module is adapted to drive the first body and the second body to separate from each other to switch to the high efficiency mode or relatively close to switch to the thin mode. The link module is connected to a display of an electronic device. The display is pivotally connected to a host. When the display is pivotally rotated relative to the host, the first body and the second body are synchronously driven to rotate relative to each other through the link module. The link module may also be linked with a linking rod mechanism at the bottom of the host. Under the operating state of the electronic device, the user drives the link module through the linking rod mechanism, thereby adjusting the size of the air outlet of the first body and the second body and the corresponding heat dissipation efficiency.

In summary, the fan module of the disclosure has the first body and the second body that may slide relative to each other, thereby respectively driving the first fan assembly and the second fan assembly to separate from each other or overlap with each other along the axial direction. When the first body and the second body are away from each other, the cross-sectional area of the circulation space is increased and the first fan assembly and the second fan assembly are separated from each other, which is configured to increase the amount of air drawn and discharged, so as to have the characteristic of high heat dissipation efficiency. When the first body and the second body are near to each other, the cross-sectional area of the circulation space is reduced and the first fan assembly and the second fan assembly are overlapped with each other, which is configured to reduce the volume, so as to have the characteristic of thinning.

What is claimed is:

1. A fan having a first body and a second body slidable relative to each other, comprising:
    the first body;
    the second body, slidably disposed at the first body to form a circulation space together;
    a first fan assembly, rotatably disposed at the first body and located in the circulation space, wherein the first fan assembly has a plurality of sliding grooves;
    a power module, being a motor and disposed in the first body and connected to the first fan assembly; and
    a second fan assembly, rotatably disposed at the second body and located in the circulation space, wherein the second fan assembly has a plurality of sliding portions, respectively and slidably disposed in the plurality of corresponding sliding grooves; wherein
    the power module is adapted to drive the first fan assembly and the second fan assembly to rotate relative to the first body, and a link module having a rack and a motor, is adapted to drive the first body and the second body to slide relative to each other along an axial direction, so that the first fan assembly and the second fan assembly are separated from each other or overlapped with each other along the axial direction.

2. The fan having the first body and the second body slidable relative to each other, according to claim 1, wherein the first fan assembly has a first fan wheel and a plurality of first fan blades, the plurality of sliding grooves is formed on an outer ring surface of the first fan wheel and each of the plurality of sliding grooves is spaced apart from each other, the plurality of first fan blades is disposed on the outer ring surface, and each of the plurality of first fan blades is arranged between respective pairs of the plurality of sliding grooves.

3. The fan having the first body and the second body slidable relative to each other, according to claim 2, wherein the second fan assembly has a second fan wheel and a plurality of second fan blades, the plurality of sliding portions is vertically formed on a bottom surface of the second fan wheel and each of the plurality of sliding grooves is spaced apart from each other, each of the plurality of second fan blades is disposed on a respective sliding portion of the plurality of sliding portions, the second fan wheel covers the first fan wheel, and the plurality of first fan blades and the plurality of second fan blades are staggered.

4. The fan having the first body and the second body slidable relative to each other, according to claim 2, wherein the first body has a hollow cylinder, extending toward the second body along the axial direction, the first fan wheel is rotatably sleeved onto the hollow cylinder, and the power module is disposed in the hollow cylinder and has a driving shaft, penetrating the hollow cylinder to connect the first fan wheel.

5. The fan having the first body and the second body slidable relative to each other, according to claim 1, wherein each of the plurality of sliding portions has two sliding surfaces, each of the plurality of sliding grooves has two blocking surfaces, each of the blocking surfaces is in contact with each of the sliding surfaces, so that each of the plurality of sliding portions slides in each of the plurality of sliding grooves along the axial direction.

6. The fan having the first body and the second body slidable relative to each other, according to claim 1, further comprising a hinge assembly having a first magnet shaft and a second magnet shaft, connected to the second body and the second fan assembly, wherein the second fan assembly is rotated relative to the second body with the hinge assembly as a center of rotation.

7. The fan having the first body and the second body slidable relative to each other, according to claim 6, wherein the shaft hinge assembly has a first magnet shaft and a second magnet shaft, the first magnet shaft is disposed in the second body, and the second magnet shaft is disposed in the second fan assembly and is in contact with the first magnet shaft.

8. The fan having the first body and the second body slidable relative to each other, according to claim 7, wherein the first magnet shaft and the second magnet shaft respectively has a first arc surface and a second arc surface in contact with each other.

9. The fan having the first body and the second body slidable relative to each other, according to claim 1, wherein a shaft assembly has a spindle, an inner ring, an outer ring, and a plurality of rollers, a first end of the spindle is connected to the second fan assembly and a second end penetrates the second body, the inner ring is fixedly sleeved onto the second end of the spindle, the outer ring is sleeved outside of the inner ring and is fixed to the second body, and the plurality of rollers is disposed between the inner ring and the outer ring.

10. The fan having the first body and the second body slidable relative to each other, according to claim 1, wherein the second body has a plurality of intake holes, communicated with the circulation space, and the plurality of intake holes is formed around an axis of the axial direction and is located corresponding to the first fan assembly and the second fan assembly.

11. The fan having the first body and the second body slidable relative to each other, according to claim 1, further comprising an air outlet, formed on one side of the first body and the second body and communicated with the circulation space, wherein the first body and the second body are adapted to slide relative to each other to adjust an area of the air outlet.

12. The fan having the first body and the second body slidable relative to each other, according to claim 1, wherein the link module is connected to the second body and is configured to drive the second body to move up and down relative to the first body along the axial direction.

13. The fan having the first body and the second body slidable relative to each other, according to claim 12, wherein the link module has a rack and a motor, the rack is fixed to the second body, a gear of the motor is meshed with the rack, the gear is adapted to pivotally rotate toward a first rotational direction or a second rotational direction opposite to the first rotational direction to lift up or lower down the rack.

14. The fan having the first body and the second body slidable relative to each other, according to claim 1, wherein an inner diameter of the second body is greater than an outer diameter of the first body, so that the second body is wrapped around the first body.

* * * * *